(12) United States Patent
Kim et al.

(10) Patent No.: US 6,838,206 B2
(45) Date of Patent: Jan. 4, 2005

(54) SAFETY PLATE OF SECONDARY BATTERY

(75) Inventors: Soo-Ryoung Kim, Daejeon (KR); Ho-Kyung Byun, Daejeon (KR); Yong-Rae Kim, Daejeon (KR); Kwang-Ho Yoo, Daejeon (KR); Jee-Ho Kim, Daejeon (KR)

(73) Assignee: LG Chemical Co., Ltd., Seoul (KR)

( * ) Notice: Subject to any disclaimer, the term of this patent is extended or adjusted under 35 U.S.C. 154(b) by 250 days.

(21) Appl. No.: 09/967,456

(22) Filed: Sep. 28, 2001

(65) Prior Publication Data

US 2002/0041993 A1 Apr. 11, 2002

(30) Foreign Application Priority Data

Sep. 29, 2000 (KR) .......................................... 2000-57507
Feb. 5, 2001 (KR) .......................................... 2001-5484

(51) Int. Cl.[7] .............................................. H01M 2/12
(52) U.S. Cl. ................................ 429/56; 429/57; 429/82
(58) Field of Search .............................. 429/53–57, 72, 429/82; 220/89.1–89.2

(56) References Cited

U.S. PATENT DOCUMENTS

| | | | | |
|---|---|---|---|---|
| 4,175,166 A | * | 11/1979 | Rosansky .................... | 429/56 |
| 4,722,874 A | * | 2/1988 | Marchak ...................... | 429/56 |
| 5,738,952 A | | 4/1998 | Abe ............................. | 429/56 |
| 6,159,631 A | * | 12/2000 | Thompson et al. ........... | 429/82 |
| 6,180,279 B1 | * | 1/2001 | Kinuta ......................... | 429/56 |
| 6,432,572 B1 | * | 8/2002 | Yoshida et al. ............... | 429/56 |
| 2003/0077505 A1 | * | 4/2003 | Goda et al. ................... | 429/56 |

FOREIGN PATENT DOCUMENTS

| | | |
|---|---|---|
| CN | 1244294 A | 2/2000 |
| JP | 02-284350 | 11/1990 |
| JP | 09-320549 | 12/1997 |
| JP | 11-204093 A | 7/1999 |

* cited by examiner

Primary Examiner—Patrick Ryan
Assistant Examiner—Tracy Dove
(74) Attorney, Agent, or Firm—Ladas & Parry

(57) ABSTRACT

In a battery in which a separator is disposed between a cathode and an anode, a jelly roll is wound with the separator. The cathode, the anode and the separator are received in a battery case and surrounded with an electrolyte, and an opening of the battery case is sealed by a top cap assembly connected to the cathode. A curved groove is formed on the battery case as a safety element for preventing the explosion of the battery due to an increase of internal pressure, the groove being formed along a line of equal stress on the surface of the battery case.

13 Claims, 8 Drawing Sheets

SAFETY PLATE OF SECONDARY BATTERY

CROSS REFERENCE TO RELATED APPLICATION

This application is based on application No. 10-2000-57507 and No. 10-2001-5484 filed in the Korean Industrial Property Office on Sep. 29, 2000 and Feb. 5, 2001 respectively, the content of which is incorporated hereinto by reference

BACKGROUND OF THE INVENTION (a) Field of the Invention

The present invention relates to a secondary battery, and more particularly, to a safety plate of the secondary battery, which may prevent the explosion of the battery due to an internal pressure of lithium ion secondary battery.

(b) Description of the Related Art

With the recent, widespread trend in the variety of portable electronic equipment such as high efficient notebook computers and wireless telephones, the demands on the secondary battery, which is able to be re-charged and has a large energy density, have been increased to be utilized as a power source of the equipment.

Among such a secondary battery, a lithium ion secondary battery includes a carbonaceous anode, a cathode of lithium metal oxide, a separator of polyolefin, and an electrolyte, of which charge and discharge are carried out by the electromotive force generated when lithium ions move between the cathode and the anode.

However, the lithium ion secondary battery is high in its operation electric potential, so that a high energy may flow instantly and a cathode material is largely increased in chemical activation by overcharge or short circuit, thereby the cathode material reacts with the electrolyte rapidly, generating a lot of gas.

As a result, pressure or temperature in the lithium ion secondary battery increases rapidly, bringing about an explosion of the battery, so that the environmental equipment may be damaged or users may be injured.

Therefore, various safety elements have been developed for preventing the explosion of the lithium ion secondary battery.

For example, U.S. Pat. No. 5,738,952 discloses a structure that a safety plate is connected to a cathode lead tap by welding to be turned over at a predetermined threshold pressure and the welded portion of the safety plate is detached to interrupt a current, thereby preventing the increase of the pressure and the temperature, wherein if the pressure exceeds the predetermined pressure, a wall of the battery case or a path through which the current flows is interrupted to prevent the increase of the pressure.

However, it still has disadvantages in that it is difficult to manufacture and assemble a safety plate responsive to pressure, even though the flow of a current may be prevented by interrupting the current flow from outside the battery in case of any abnormal reaction of the battery, since such an additional safety plate is mounted outside the battery case. Japanese Patent Laying-open Publication Nos. 02-284350 and 09-320549 disclose a safety element for a secondary battery that is formed of a groove in the shape of straight line or "X" formed of such straight lines on the surface of a battery case.

Such a rectilinear groove has, however, different distances to each point of the groove from the center part of a side surface which has a maximum area to be swollen the most at a predetermined threshold pressure at which the whole battery case is swollen to break, and, accordingly, pressures applied to each part of the groove become different, so that all parts of the groove are not broken simultaneously but the weakest part is broken first.

Therefore, it is impossible to form the groove to be broken simultaneously in all parts but forming the whole groove of the battery case with different thickness, since it is most preferable that the whole groove becomes broken simultaneously.

Further, it is another problem that it is difficult to design the safety element since a pressure deviation is different according to the position of the groove and the size of the battery case.

In case of the groove in the shape of "X", it has disadvantages that it is difficult to engrave the groove on the battery case precisely and a new design is required in order to break the groove at a predetermined pressure considering the size of the battery case.

Further, the rectilinear groove and the X-shaped groove may hurt users due to the sharp broken parts of the groove, even though it is possible to prevent the explosion of the battery after being broken.

SUMMARY OF THE INVENTION

Accordingly, the present invention is directed to a safety plate of a secondary battery that substantially obviates one or more of the problems due to limitations and disadvantages of the related art.

An object of the present invention is to provide a safety plate of a secondary battery, in which a groove is applied with a uniform pressure when the internal pressure of the secondary battery is raised to allow the groove to be broken simultaneously.

Another object of the present invention is to provide a safety plate of a secondary battery, in which a pressure deviation for breaking a groove is uniform according to the size of the battery case and the position of the groove, for promoting the safety of the secondary battery.

A further object of the present invention is to provide a safety plate of a secondary battery, which may prevent users from being injured due to broken parts of a groove after the groove is broken.

To achieve these and other advantages and in accordance with the purpose of the present invention, as embodied and broadly described, in a battery, in which a separator is disposed between a cathode and an anode, a jelly roll wound with the separator, the cathode and the anode is received in a battery case and surrounded with an electrolyte, and an opening of the battery case is sealed by a top cap assembly connected to the cathode, the battery is characterized in that a groove is formed on the battery case as a safety element for preventing explosion of the battery due to an increase of internal pressure, the groove being formed as a curve along a line of equal stress on the surface of the battery case.

The curved groove may be formed outside the battery case, which is formed prismatic in the shape of a hexahedron and the curved groove is formed on the side surface having a largest surface area.

The curved groove may be and formed on a diagonal line of the side surface having the largest surface area of the prismatic battery case with a curvature ranging from 3 mm to 50 mm.

Also, a rectilinear groove may be extended from both or either ends of the curved groove.

A thickness of the groove on the battery case may be between 10% to 30% of the thickness of the battery case.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
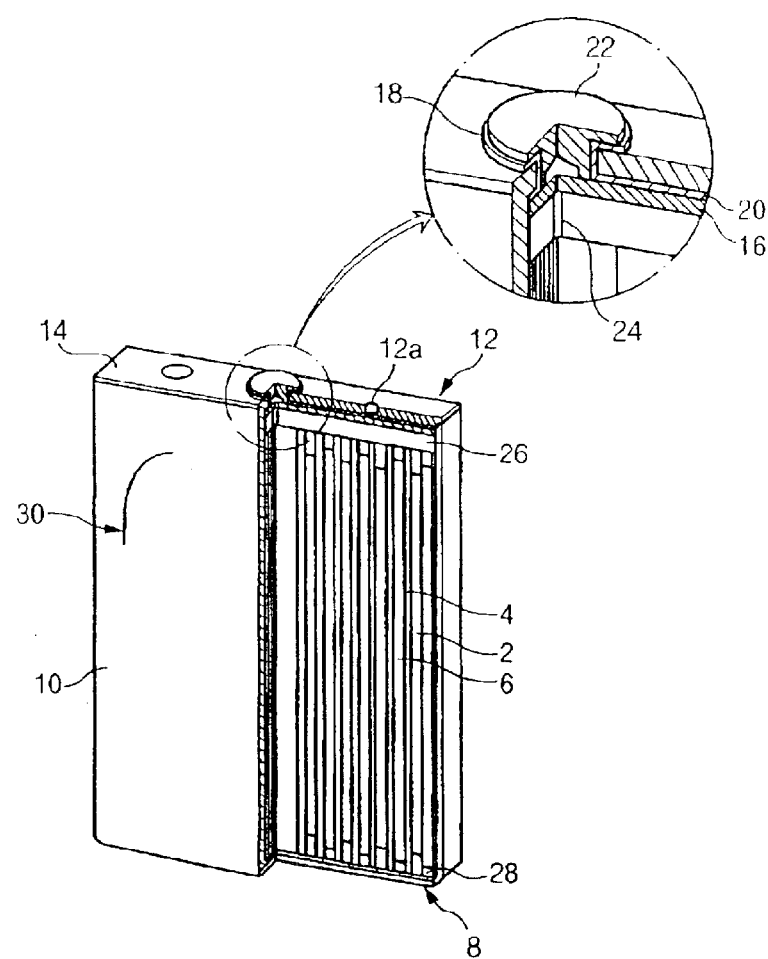
FIG. 1 is a perspective view of a partially taken and expanded secondary battery formed with a safety plate according to a preferred embodiment of the present invention.

Reference will now be made in detail to preferred embodiments of the present invention, examples of which are illustrated in the accompanying drawings. FIG. 1 is a perspective view showing a partially taken and expanded secondary battery formed with a safety plate according to the present invention.

Among various secondary batteries, the present invention will be described with reference to a lithium ion prismatic secondary battery (hereinafter, referred to as "prismatic secondary battery").

A prismatic secondary battery includes a jelly roll 8 wound with a cathode 2, a separator 4, and an anode 6 together and received in a battery case 10 which is connected to the anode. The prismatic secondary battery is mounted with a top cap assembly 12 which is connected to the cathode 2 on the battery case 10, wherein an electrolyte solution is injected into the battery case 10 via an injection hole 12a formed in the top cap assembly 12 and the injection hole 12a is sealed.

The top cap assembly 12 includes a top cap 14 to be welded on the battery case 10, a lower plate 16 disposed in the center of a lower part of the top cap 14, and a cathode terminal 22 which is riveted between the top cap 14 and the lower plate 16 via upper and lower gaskets 18, 20 together with the gaskets.

The lower plate 16 is connected to the anode 6 and a tap 24 of the jelly roll 8.

The jelly roll 8 is disposed with an upper insulation plate 26 and a lower insulation plate 28 at an upper end part and a lower end part respectively for insulation.

The prismatic secondary battery as above is formed with a safety plate 30 on a battery case as a safety element against explosion.

Figure 2:
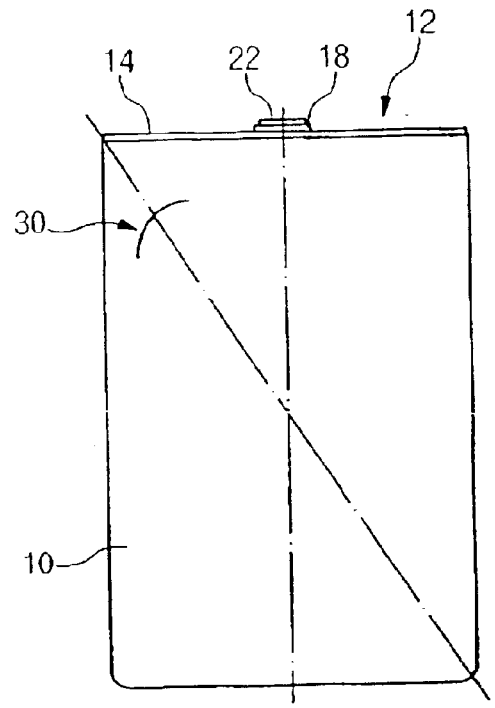
FIG. 2 is a front view showing a side surface of a maximum area of the battery case formed with the safety plate according to the present invention.
Figure 3:
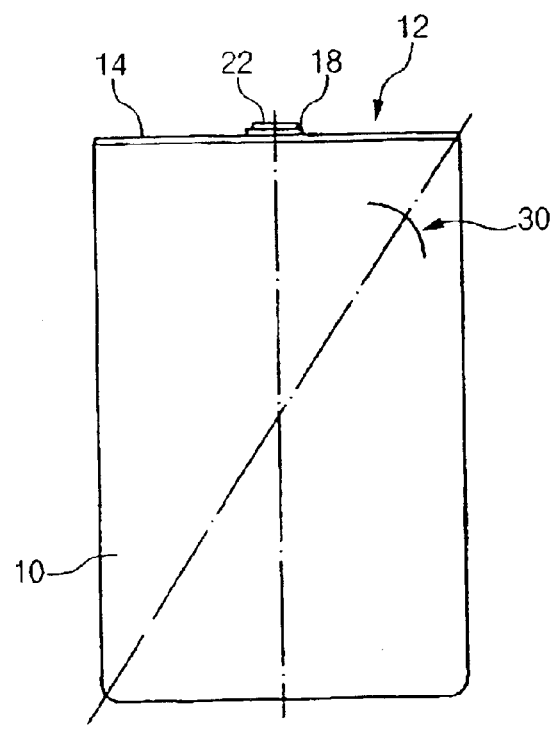
FIG. 3 is a front view showing a position of a safety plate according to another preferred embodiment of the present invention.

The safety plate 30 is, as shown in FIG. 2 and FIG. 3, designed to be a curved groove formed on the battery case 10 to be torn out when internal pressure of the battery is excessively raised.

The curved groove is preferably formed on a side surface having a maximum area part outside the battery case 10, wherein the side surface of the maximum area part of the battery case is the weakest part to be swollen first when the inner pressure of the secondary battery is excessively raised.

The curved groove is preferably formed outside the battery case 10 to advantageously emit the internal pressure of the battery.

The curved groove which is engraved on the battery case 10 according to the present invention is positioned in the center of a curvature on a diagonal line of the side surface having the maximum area part or an imaginary line extended from the diagonal line, so as to be broken at a threshold pressure more precisely than a prior rectilinear or X-shaped groove.

Particularly, the curved groove is formed near each corner rather than a center part of the maximum area part and preferably has a curvature of about 3 mm to 50 mm.

The curved groove is formed considering the concentration of stress applied to the side surface of the maximum area part. That is, it will be apparent to those skilled in the art that the center part of the maximum area part is swollen the most and the four edged corner parts are swollen the least, if the side surface of the maximum area part is swollen due to the increase of the internal pressure of the prismatic secondary battery.

Figure 4:
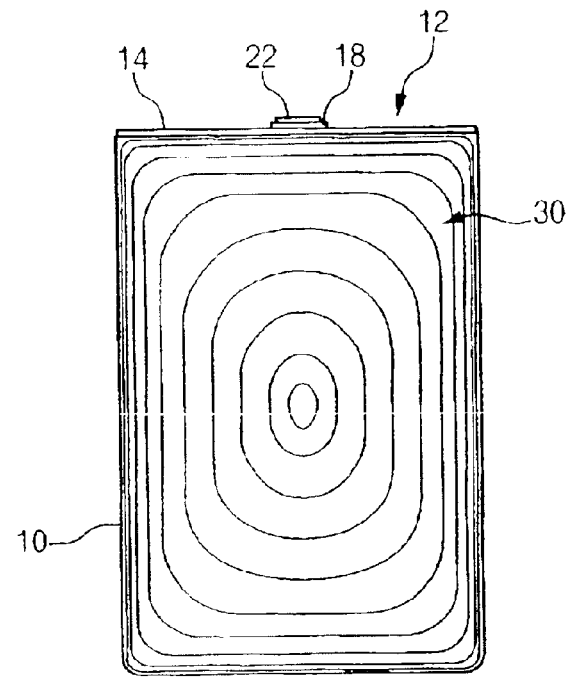
FIG. 4 is a front view showing an estimated stress distribution with closed curve lines in case that internal pressure is generated in a secondary battery formed with a safety plate.

If connecting the points where stress is applied equally on the entire side surface of the maximum area part, the distribution of the stress points is exhibited in closed oval curve lines toward the center part of the side surface of the maximum area part, and exhibited in close rectangular lines toward the outer corner parts of side surface, as shown in FIG. 4.

The stress changes rapidly between the center part and the corner parts of the maximum area part, and the curved groove of the present invention is formed in the weakest parts.

Therefore, the concentration of the stress is generated on all parts of the curved groove with little deviation, so that the groove is broken simultaneously in almost all parts when the safety plate 30 is broken, thereby minimizing the pressure deviation.

Figure 5:
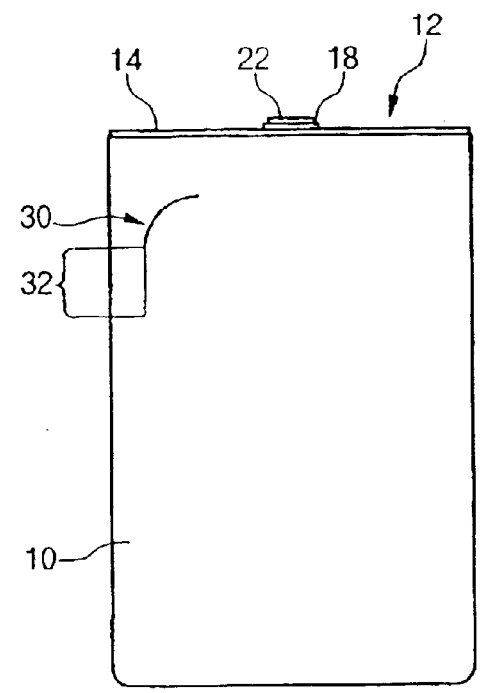
FIG. 5 to FIG. 7 are front views respectively showing a secondary battery formed with a safety plate according to other preferred embodiments of the present invention.

By the same reason, a rectilinear groove 32 as shown in FIG. 5 may be extended from both or either ends of the curved groove. The rectilinear groove 32 is preferably 5 mm or less, wherein the pressure deviation may be increased if the rectilinear groove 32 is longer than 5 mm.

Figure 6:
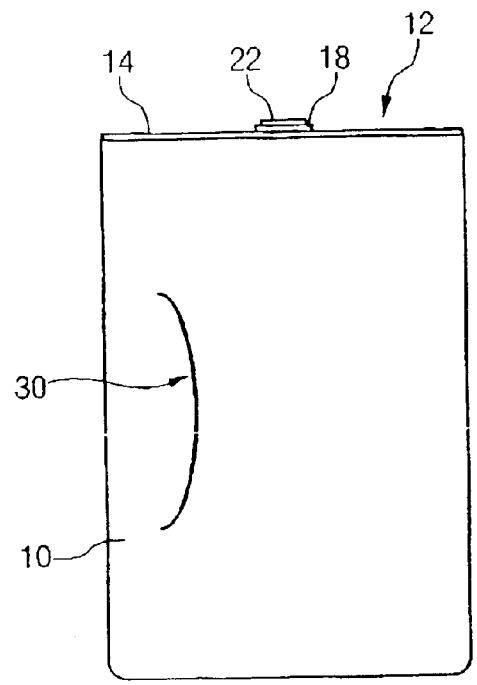
Figure 7:
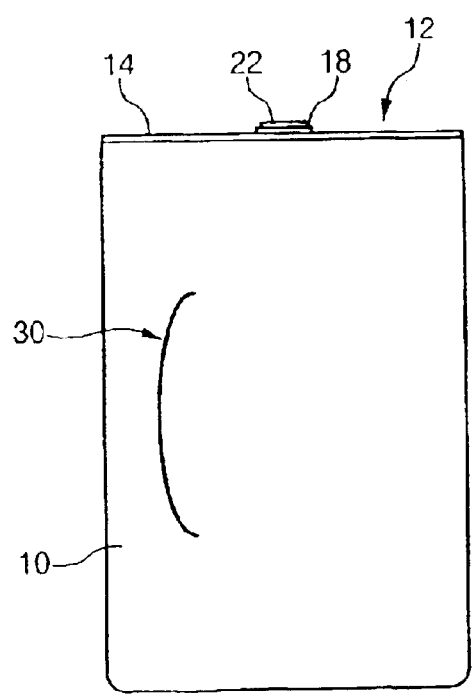

FIG. 6 and FIG. 7 respectively show a preferred embodiment of the present invention, in which the safety plate 30 is formed in the maximum area part of the battery case 10 in different shapes.

The battery case 10 of a general lithium ion prismatic secondary battery is formed of any one among stainless, nickel-plated steel, aluminium alloy and plastics.

The battery case 10 has a thickness designed according to the size of the battery and the material of the battery case, wherein it is preferable to form the battery case with a thickness in the range of 0.3 mm to 0.7 mm.

The curved groove formed on the battery case 10 has a thickness smaller than that of the battery case 10, wherein the battery case in the curved groove part becomes thicker as the threshold pressure is designed higher and thinner as the threshold pressure is designed lower.

In particular, the thickness of the battery case in the groove part is preferably 10% to 30% of the thickness of the battery case 10.

The present invention will now be described in more detail with reference to the preferred embodiments, which do not limit the present invention thereto.

EMBODIMENT

A jelly roll 8 in which a cathode 2 of lithium cobalt oxide is separated from an anode 6 of carbon activated material by a separator 4 of olefin is received in the battery case 10 as shown in FIG. 1.

The battery case 10 is formed prismatic with a thickness of 0.45 mm, a length of 63 mm, and a height of 48 mm.

The curved groove formed on the battery case 10 has a width of 0.7 mm, a length of 13 mm, a thickness of 0.1 mm and a curvature radius of 40 mm.

Under the circumstances that the jelly roll 8 is received in the battery case 10, the tap 24 attached to the cathode of the jelly roll is welded to a positive electrode terminal 22 of the top cap assembly 12.

After welding the top cap 14 by laser in close contact with an opening of the battery case 10, an electrolyte solution containing ethylene carbonate(EC), diethylene carbonate (DEC), and lithium salt(LiPF$_6$) is injected via the electrolyte solution injection hole 12a of the top cap 14 and the electrolyte solution injection hole 12a is sealed, thereby a lithium ion prismatic secondary battery is manufactured.

COMPARISON EXAMPLE

Figure 8:
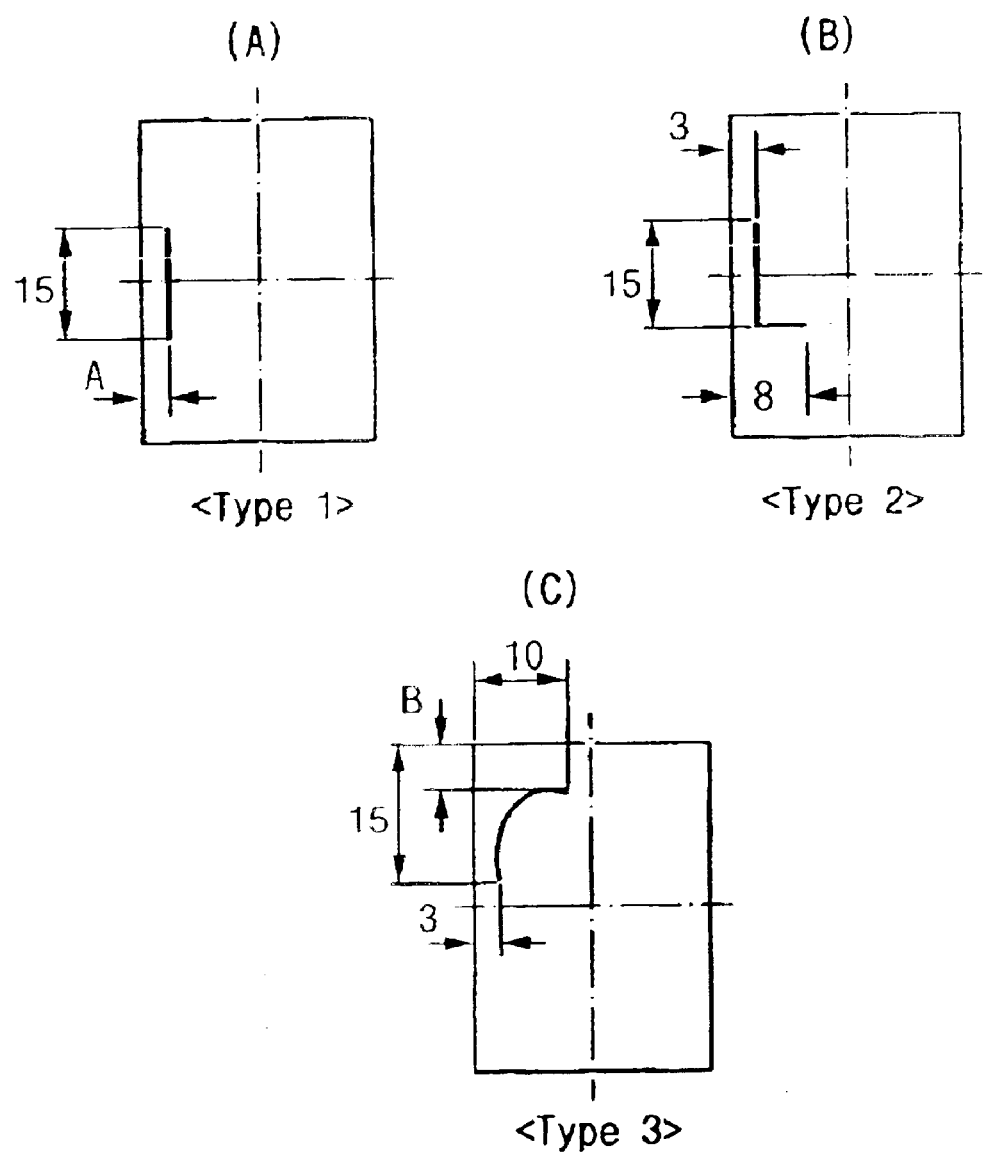
FIGS. 8(A-C) is a view for comparing secondary batteries respectively formed with a safety plate according to the embodiments of the present invention.

As shown in FIG. 8, safety plates of various shapes were formed on a side surface of a maximum area part and a break pressure of the secondary battery was measured while gradually increasing the pressure to break an initial safety plate. In FIG. 8, all numerals were represented by millimeter.

The grooves of the safety plates were formed by electro-discharge machining, wherein the battery cases formed with the grooves were formed of aluminium with a thickness of 0.1 mm, and the grooves have a thickness of 0.4 mm.

In type 1, two kinds of A are formed with a length of 2 mm and 5 mm, respectively.

In type 3, three kinds of B are formed with a length of 3 mm, 5 mm, and 7 mm, respectively.

The result of the break test is represented in table 1, wherein X represents that no break was generated.

TABLE 1

| Number of times | Type 1 | Type 2 | Type 3 (B = 3 mm) | Type 3 (B = 5 mm) | Type 3 (B = 7 mm) |
| --- | --- | --- | --- | --- | --- |
| 1 | X | X | 7.5 | 8.1 | 7.0 |
| 2 | X | X | 7.0 | 8.4 | 9.0 |

TABLE 1-continued

| Number of times | Type 1 | Type 2 | Type 3 (B = 3 mm) | Type 3 (B = 5 mm) | Type 3 (B = 7 mm) |
| --- | --- | --- | --- | --- | --- |
| 3 | X | X | 7.5 | 7.3 | 9.5 |
| 4 | X | X | 7.0 | 7.0 | 9.0 |
| 5 | X | X | 7.0 | 7.8 | 8.1 |
| 6 | X | X | 8.0 | 7.8 | 9,3 |
| 7 | X | X | 8.1 | 7.0 | 8.6 |
| 8 | X | X | 7.2 | 8.2 | 8.2 |
| 9 | X | X | 8.0 | 8.1 | 8.2 |

As represented in Table 1, the curved grooves are formed at the weakest portion of the maximum area part, so that the safety plates were always broken first and a pressure deviation in case of such a break is 1 kgf/cm$^2$ or less.

That is, the lithium ion prismatic secondary batteries were broken stably without explosion by using the safety plates formed of the curved grooves.

EXPERIMENTAL EXAMPLE 1

In order to test whether the break of the safety plate is generated stably when an abnormal internal pressure is generated in the lithium ion prismatic secondary battery, an overcharge test, a hot box test and a drop test were carried out.

The drop test of UL1642 standard was carried out for checking the stability of the lithium ion prismatic secondary battery by dropping the battery case at a height of 1.9 m three times to observe whether the curved groove is broken.

As a result of the test, the curved groove was not broken. The overcharge test of 3C is carried out by using charge/discharge testing machines to observe a pressure at which the safety plate is broken.

Figure 9:
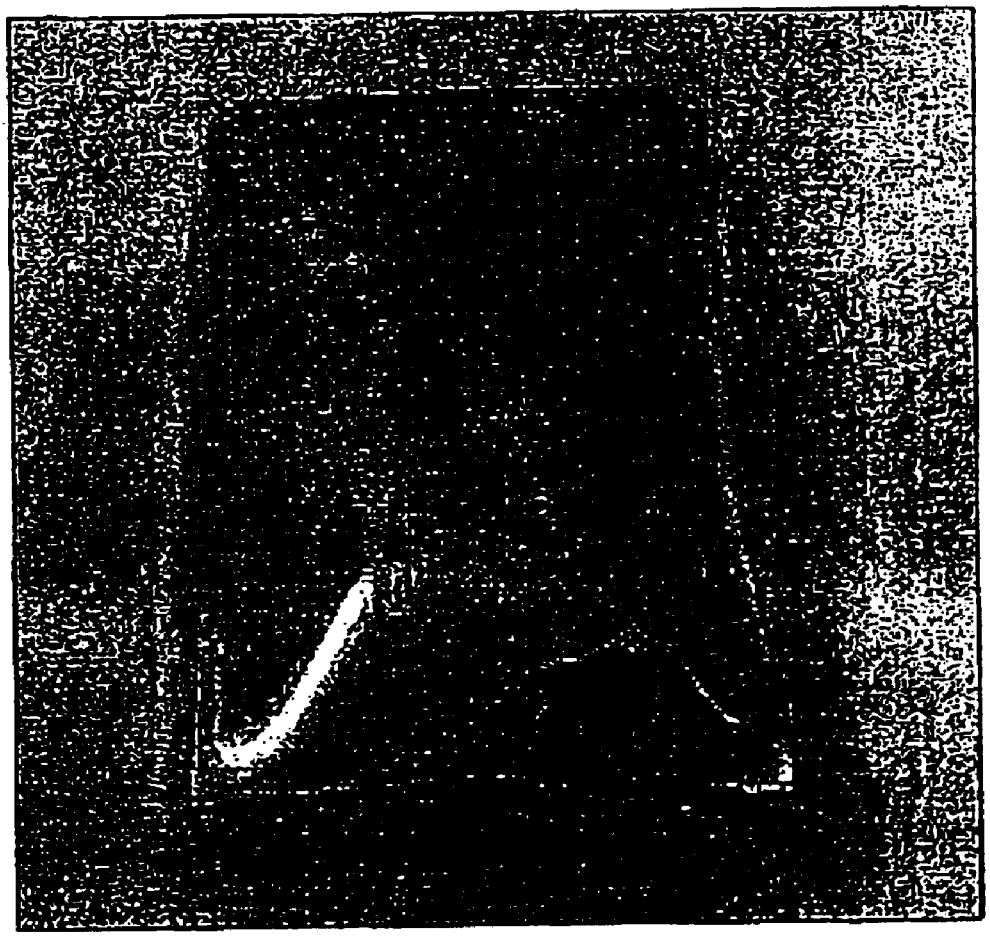
FIG. 9 is a view showing a state that the safety plate is broken due to forcible overcharge of the secondary battery formed with the safety plate according to the present invention.

As a result of the overcharge test, the safety plate still operated as shown in FIG. 9.

Figure 10:
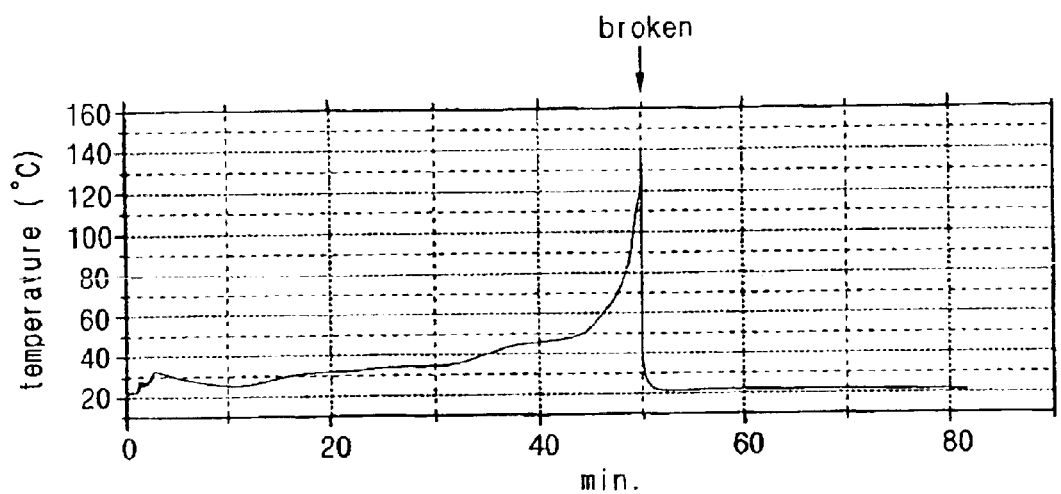
FIG. 10 is a graph showing a change of temperature in the secondary battery when the safety plate is broken due to the overcharge.
Figure 11:
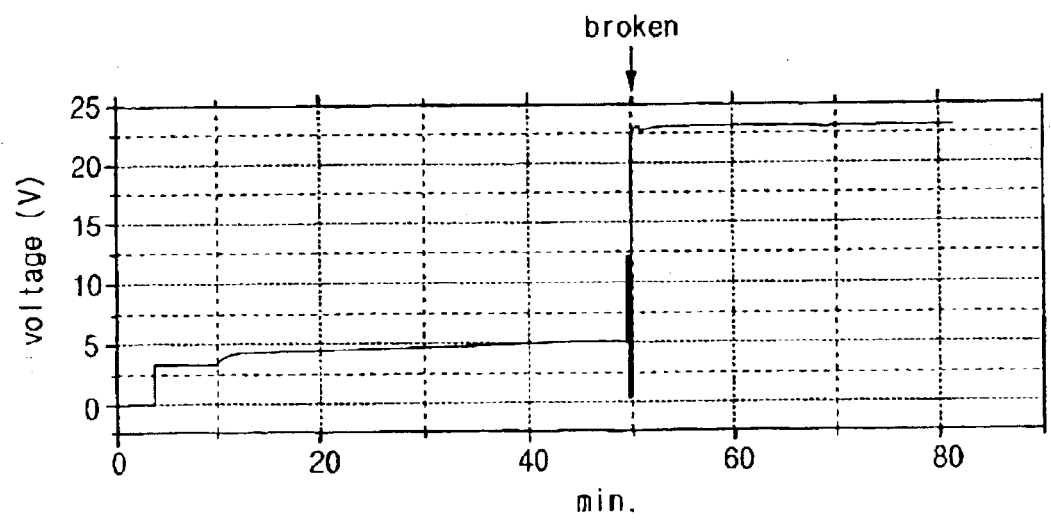
FIG. 11 is a graph showing a change of voltage in the secondary battery when the safety plate is broken due to the overcharge.

A change of internal temperature and a change of voltage of the lithium ion prismatic secondary battery, which was subject to the overcharge, are respectively represented in graphs of FIG. 10 and FIG. 11.

The hot box test is carried out for observing whether the safety plate is broken while raising the temperature of the prismatic secondary battery.

Figure 12:
FIG. 12 is a view showing a state that the safety plate is broken by increasing temperature of a hot box in which the secondary battery formed with the safety plate according to the present invention is received.

As a result of the hot box test, the safety plate was broken when the temperature of the inside of the hot box was raised up to about 150° C., as shown in FIG. 12.

EXPERIMENTAL EXAMPLE 2

In experimental example 2, It was tested whether the safety plate designed according to the present invention in view of a size of the prismatic secondary battery is stably broken and the safety plate is broken to pressure deviation.

In table 2 below, A type is a lithium ion prismatic secondary battery having a thickness of 6.3 mm, a width of 3.4 cm, and a height of 5.0 cm, and B type is a battery having a thickness of 6.3 mm, a width of 3.0 cm and a height of 6.7 cm.

TABLE 2

| Number of times | A type battery Break Pressure (kgf/cm2) | B type battery Break Pressure (kgf/cm2) | Number of times | A type battery Break Pressure (kgf/cm2) | B type battery Break Pressure (kgf/cm2) |
|---|---|---|---|---|---|
| 1 | 10.2 | 10.5 | 16 | 10 | 11 |
| 2 | 9.8 | 11 | 17 | 10.2 | 11 |
| 3 | 10 | 11 | 18 | 10 | 11 |
| 4 | 10.2 | 10.8 | 19 | 9.9 | 11 |
| 5 | 10.5 | 11 | 20 | 10 | 11 |
| 6 | 10.2 | 10.5 | 21 | 10 | 10.5 |
| 7 | 10.2 | 10.5 | 22 | 10.2 | 11 |
| 8 | 10 | 11 | 23 | 10 | 11 |
| 9 | 10.3 | 11 | 24 | 10.2 | 10.5 |
| 10 | 10.5 | 11 | 25 | 10.2 | 11 |
| 11 | 10.7 | 10.5 | 26 | 10.2 | 12 |
| 12 | 10 | 10.5 | 27 | 10.2 | 10.5 |
| 13 | 10.1 | 11 | 28 | 10.2 | 11 |
| 14 | 10 | 10.5 | 29 | 10.2 | 11 |
| 15 | 9.9 | 11 | 30 | 10.2 | 10.5 |

| | A type battery | B type battery |
|---|---|---|
| Maximum Break Pressure (kgf/cm2) | 10.7 | 12 |
| Minimum Break Pressure (kgf/cm2) | 9.8 | 10.5 |
| Average Break Pressure (kgf/cm2) | 10.1 | 10.9 |

As shown in table 2, the break pressure is in the range of 1.1 kgf/cm$^2$ with reference to the average break pressure. That is, the break pressure deviation was not large so that a more stable break may be estimated, improving the stability of the prismatic secondary battery.

As described hereinabove, a safety plate of a secondary battery according to the present invention exhibits improved effect in view of prior art.

In other words, pressure is uniformly applied to the curved groove when the internal pressure of the secondary battery is raised, so that the break occurs almost simultaneously in all parts of the curved groove, reducing the danger of explosion of the secondary battery.

Further, the safety of the secondary battery is improved by reducing the break pressure deviation considering the size of the battery case and the position of the groove.

Furthermore, a user is prevented from being injured even after the break of the groove, since the groove is formed in a curved shape.

While the present invention has been described and illustrated herein with reference to the preferred embodiments thereof, it will be apparent to those skilled in the art that various modifications and variations can be made therein without departing from the spirit and scope of the invention. Thus, it is intended that the present invention cover the modifications and variations of this invention that come within the scope of the appended claims and their equivalents.

What is claimed is:

1. A battery in which a separator is disposed between a cathode and an anode, a jelly roll wound with the separator, the cathode and the anode is received in a hexagonal battery case and surrounded with an electrolyte, and an opening of the hexagonal battery case is sealed by a top cap assembly, is characterized in that a curved groove is formed on the hexagonal battery case as a safety element for preventing an explosion of the battery due to the increase in internal pressure, the curved groove being formed along a equal stress line where equal stress occurs when excess internal pressure builds up within the hexagonal battery case.

2. A battery as claimed in claim 1, wherein the curved groove is formed outside the battery case.

3. A battery as claimed in claim 2, wherein the curved groove is formed on a side surface having a largest surface area in the hexagonal battery case.

4. A battery as claimed in claim 3, wherein the curved groove is formed on a diagonal line of the side surface having the largest surface area.

5. A battery as claimed in claim 3, wherein the curved groove is curved with a radius of curvature of ranging from 3 mm to 50 mm.

6. A battery as claimed in claim 4, wherein the curved groove is formed with a rectilinear groove extended from both ends of the curved groove.

7. A battery as claimed in claim 4, wherein the curved groove is formed with a rectilinear groove extended from either end of the curved groove.

8. A battery as in claim 5, wherein the curved groove is formed with a rectilinear groove extended from both ends of the curved groove.

9. A battery as in claim 5, wherein the curved groove is formed with a rectilinear groove extended from either ends of the curved groove.

10. A battery as claimed in claim 6, wherein the thickness of the groove on the battery case is between 10% to 30% of the thickness of the hexagonal battery case.

11. A battery as claimed in claim 7, wherein the thickness of the groove on the battery case is between 10% to 30% of the thickness of the hexagonal battery case.

12. A battery as claimed in claim 8, wherein the thickness of the groove on the battery case is between 10% to 30% of the thickness of the hexagonal battery case.

13. A battery as claimed in claim 9, wherein the thickness of the groove on the battery case is between 10% to 30% of the thickness of the hexagonal battery case.

* * * * *